(12) United States Patent
Noh

(10) Patent No.: US 12,113,235 B2
(45) Date of Patent: Oct. 8, 2024

(54) CYLINDRICAL BATTERY AND METHOD FOR MANUFACTURING THE SAME

(71) Applicant: LG ENERGY SOLUTION, LTD., Seoul (KR)

(72) Inventor: Han A Noh, Daejeon (KR)

(73) Assignee: LG ENERGY SOLUTION, LTD., Seoul (KR)

( * ) Notice: Subject to any disclaimer, the term of this patent is extended or adjusted under 35 U.S.C. 154(b) by 80 days.

(21) Appl. No.: 17/613,297

(22) PCT Filed: Jul. 17, 2020

(86) PCT No.: PCT/KR2020/009459
§ 371 (c)(1),
(2) Date: Nov. 22, 2021

(87) PCT Pub. No.: WO2021/010792
PCT Pub. Date: Jan. 21, 2021

(65) Prior Publication Data
US 2022/0223971 A1    Jul. 14, 2022

(30) Foreign Application Priority Data

Jul. 17, 2019   (KR) .................. 10-2019-0086460

(51) Int. Cl.
*H01M 50/342*  (2021.01)
*H01M 10/04*   (2006.01)
(Continued)

(52) U.S. Cl.
CPC ... *H01M 50/3425* (2021.01); *H01M 10/0422* (2013.01); *H01M 50/152* (2021.01);
(Continued)

(58) Field of Classification Search
CPC ......... H01M 50/3425; H01M 10/0422; H01M 50/152; H01M 50/169; H01M 50/583;
(Continued)

(56) References Cited

U.S. PATENT DOCUMENTS

2004/0076873 A1    4/2004  Chiu
2010/0209746 A1*   8/2010  Kiyama ............. H01M 50/325
                                                    429/56
(Continued)

FOREIGN PATENT DOCUMENTS

CN    101821875 A    9/2010
JP    2000-30733 A   1/2000
(Continued)

OTHER PUBLICATIONS

Machine translation of KR 2009-0095794, retrieved from <www.espacenet.com> on Sep. 19, 2023.*
(Continued)

*Primary Examiner* — Cynthia K Walls
(74) *Attorney, Agent, or Firm* — Birch, Stewart, Kolasch & Birch, LLP

(57) ABSTRACT

A cylindrical battery includes a metal can, an electrode assembly mounted in the metal can, and a cap assembly located at an upper end of the metal can, the cap assembly (Continued)

including a top cap, a safety vent, and a current shut-off member. A hole mark is formed on the safety vent.

18 Claims, 9 Drawing Sheets

(51) Int. Cl.
  *H01M 50/152*  (2021.01)
  *H01M 50/169*  (2021.01)
  *H01M 50/583*  (2021.01)
  *H01M 50/636*  (2021.01)
(52) U.S. Cl.
  CPC ....... *H01M 50/169* (2021.01); *H01M 50/583* (2021.01); *H01M 50/636* (2021.01)
(58) Field of Classification Search
  CPC ........... H01M 50/636; H01M 2200/20; H01M 10/052; H01M 10/0587; H01M 10/488; H01M 50/119; H01M 50/159; H01M 50/184; H01M 50/186; H01M 50/191; H01M 50/578; H01M 50/107; H01M 50/30; H01M 50/574; H01M 50/609; H01M 50/60; Y02E 60/10; Y02P 70/50
  See application file for complete search history.

(56) References Cited

U.S. PATENT DOCUMENTS

| | | |
|---|---|---|
| 2011/0052950 A1 | 3/2011 | Yoo |
| 2011/0300437 A1 | 12/2011 | Yi |
| 2012/0100404 A1* | 4/2012 | Lee ................ H01M 50/171 429/82 |
| 2015/0229008 A1 | 8/2015 | Yoo |
| 2019/0006635 A1 | 1/2019 | Kim et al. |

FOREIGN PATENT DOCUMENTS

| | | | |
|---|---|---|---|
| JP | 2013-140672 | A | 7/2013 |
| KR | 10-1999-0049247 | A | 7/1999 |
| KR | 10-2006-0106463 | A | 10/2006 |
| KR | 10-2007-0067779 | A | 6/2007 |
| KR | 10-2007-0071236 | A | 7/2007 |
| KR | 10-0779002 | B1 | 11/2007 |
| KR | 10-2008-0037862 | A | 5/2008 |
| KR | 10-2009-0095794 | A | 9/2009 |
| KR | 10-2010-0059964 | A | 6/2010 |
| KR | 10-2011-0024249 | A | 3/2011 |
| KR | 10-2011-0132856 | A | 12/2011 |
| KR | 10-1372477 | B1 | 3/2014 |
| KR | 10-2015-0029532 | A | 3/2015 |
| KR | 10-2017-0140919 | A | 12/2017 |
| KR | 10-2018-0010389 | A | 1/2018 |

OTHER PUBLICATIONS

International Search Report for PCT/KR2020/009459 mailed on Oct. 29, 2020.
Extended European Search Report for European Application No. 20839713.3, dated Jun. 7, 2022.

* cited by examiner

[FIG. 1]
RELATED ART
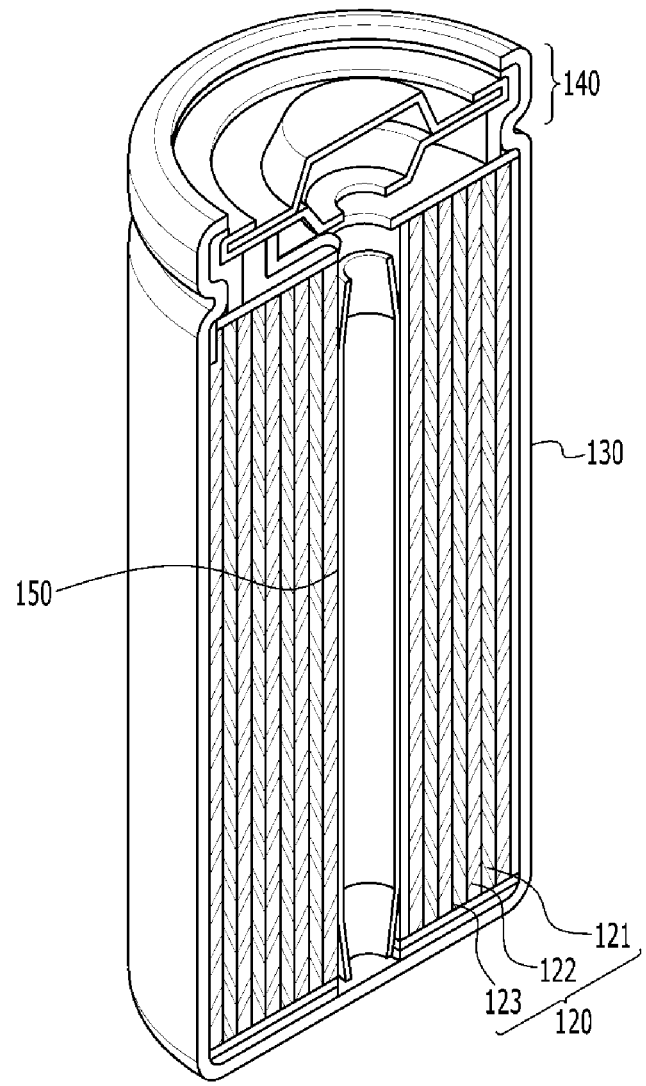

[FIG. 2]
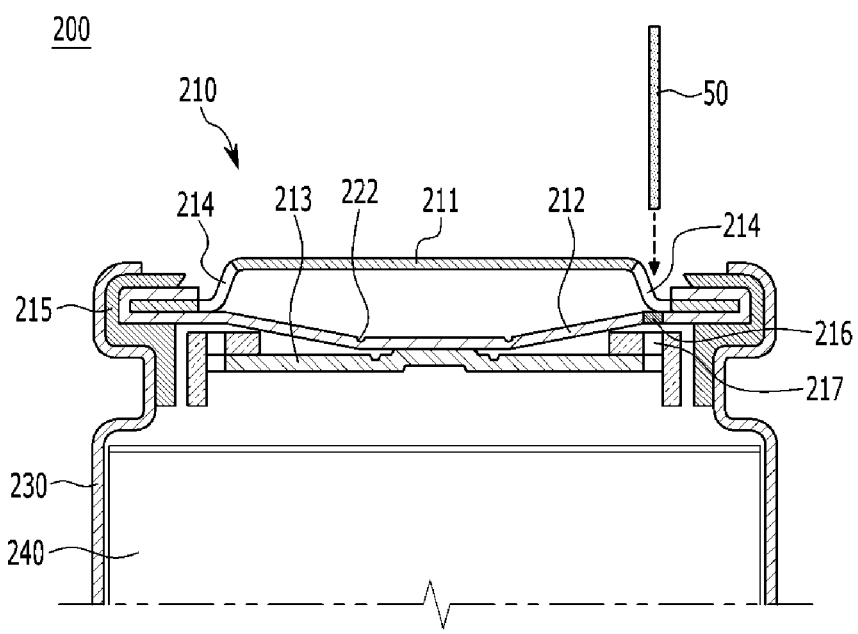
[FIG. 3]
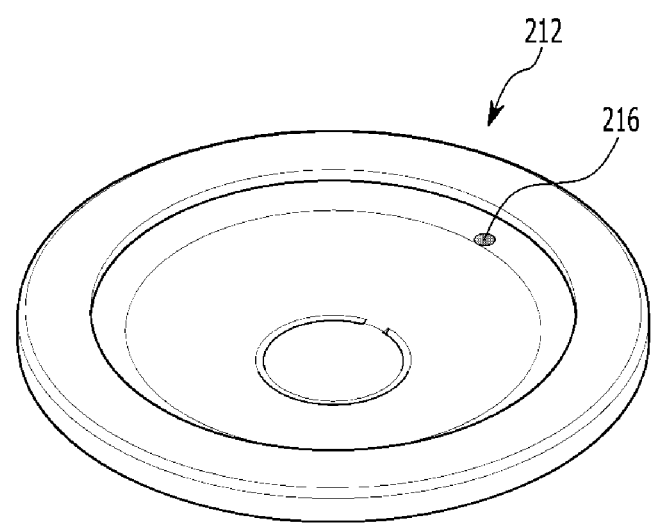

[FIG. 4]
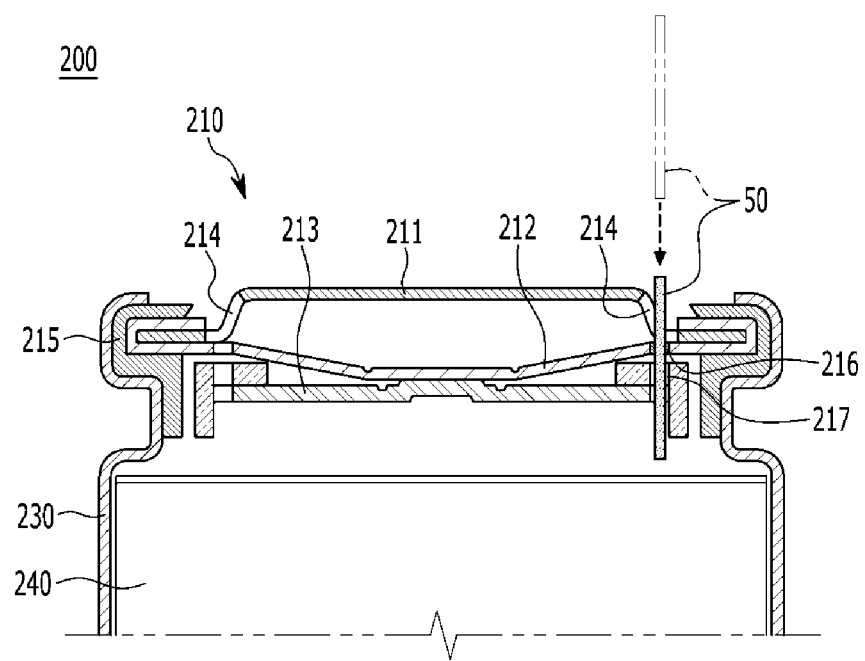

【FIG. 5】
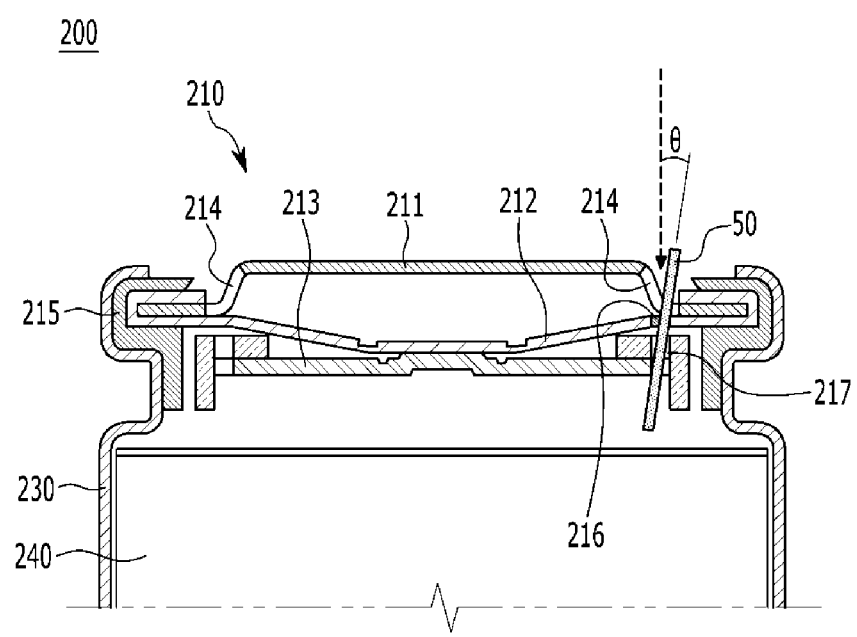

[FIG. 6]
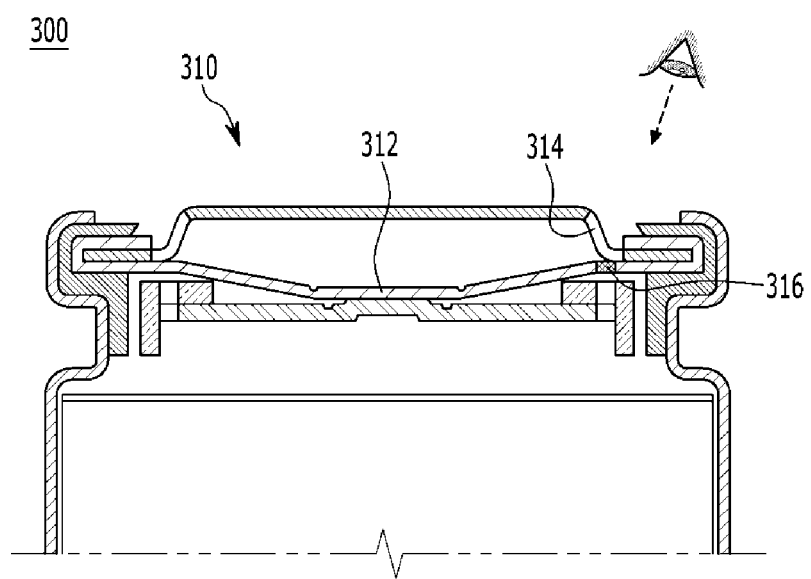

【FIG. 7】
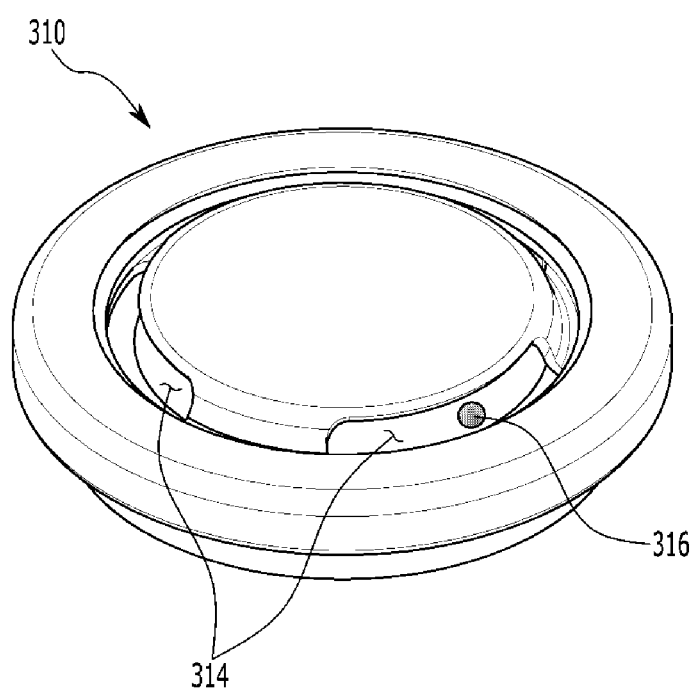

[FIG. 8]
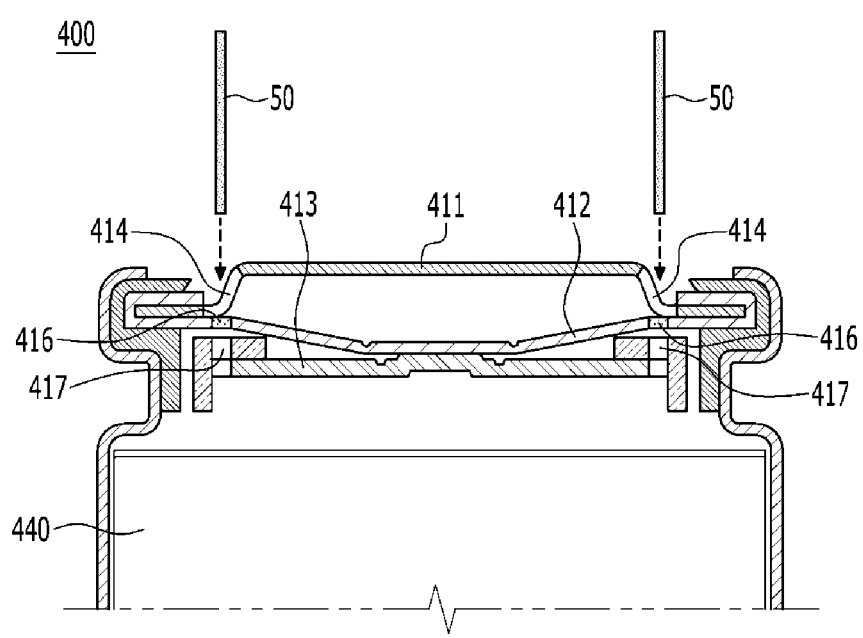

[FIG. 9]
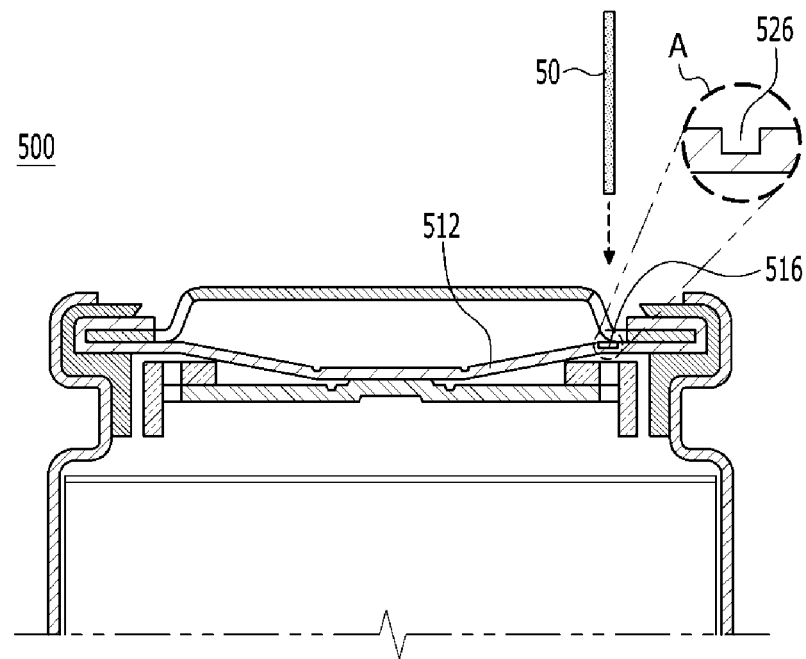

[FIG. 10]
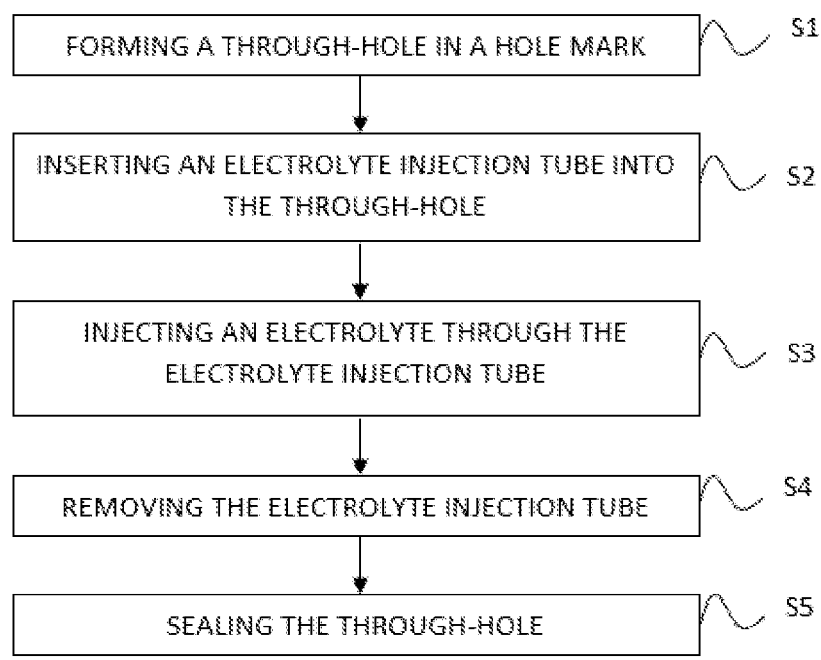

CYLINDRICAL BATTERY AND METHOD FOR MANUFACTURING THE SAME

TECHNICAL FIELD

Cross Citation with Related Application(s)

This application claims the benefit of Korean Patent Application No. 10-2019-0086460, filed on Jul. 17, 2019, with the Korean Intellectual Property Office, the disclosure of which is incorporated herein by reference in its entirety.

The present disclosure relates to a cylindrical battery and a method for manufacturing the same.

BACKGROUND ART

As energy prices are increasing due to the depletion of fossil fuels and increasing attention is being paid to environmental pollution, the demand for environmentally-friendly alternative energy sources acts as an essential factor for future life. Thus, research into techniques for generating various kinds of power, such as nuclear energy, solar energy, wind energy, and tidal power, is underway, and power storage apparatuses for more efficient use of the generated energy are also drawing much attention.

Moreover, the demand for batteries as energy sources is rapidly increasing as mobile device technology continues to develop and the demand for such mobile devices continues to increase. Accordingly, much research on batteries capable of satisfying various needs has been carried out. In particular, in terms of the material for batteries, the demand for lithium secondary batteries, such as lithium ion batteries and lithium ion polymer batteries, which have advantages such as high energy density, discharge voltage, and output stability, is very high.

Secondary batteries may be classified based on the structure of an electrode assembly having a structure in which a positive electrode and a negative electrode are stacked in the state in which a separator is interposed between the positive electrode and the negative electrode. For example, the electrode assembly may be configured to have a jelly-roll (wound) type structure in which a long sheet type positive electrode and a long sheet type negative electrode are wound in the state in which a separator is disposed between the positive electrode and the negative electrode or a stacked (laminated) type structure in which pluralities of positive electrodes and negative electrodes each having a predetermined size are sequentially stacked in the state in which separators are disposed respectively between the positive electrodes and the negative electrodes. In recent years, in order to solve problems caused by the jelly-roll type electrode assembly and the stacked type electrode assembly, there has been developed a stacked/folded type electrode assembly, which is a combination of the jelly roll type electrode assembly and the stacked type electrode assembly, having an improved structure in which predetermined numbers of positive electrodes and negative electrodes are sequentially stacked in the state in which separators are disposed respectively between the positive electrodes and the negative electrodes to constitute a unit cell, after which a plurality of unit cells is sequentially folded in the state of having been placed on a separation film.

These electrode assemblies are mounted in a pouch case, a cylindrical can, a prismatic case, and the like depending on the purpose of use to produce a battery.

Among them, the cylindrical battery has the advantages of being easy to manufacture and having a high energy density per weight, and thus, is used as an energy source for various devices ranging from portable computers to electric vehicles.

FIG. 1 is a cross-sectional schematic diagram illustrating a cylindrical battery according to the related art.

Referring to FIG. 1, the cylindrical battery 100 is manufactured by receiving a jelly-roll type electrode assembly 120 in a cylindrical case 130, injecting an electrolyte in the cylindrical case 130, and coupling a top cap 140 to an opened upper end of the cylindrical case 130.

The jelly-roll type electrode assembly 120 has a structure, in which a positive electrode 121, a negative electrode 122, and a separator 123 are stacked to be wound in a round shape, and a cylindrical center pin 150 is inserted into a central portion of the electrode assembly 120, which is a winding core. The center pin 150 functions to fix and support the electrode assembly 120, and also functions as a passage for discharging gas generated through internal reactions when the battery is charged and discharged, and is operated.

An oxidation and a decomposition reaction of the electrolyte are performed as the conventional cylindrical battery 100 is repeatedly charged and discharged, so that there is a problem that the lifetime of the cylindrical battery 100 rapidly decreases. However, according to the conventional cylindrical battery 100, the electrolyte can be neither exchange nor added structurally.

DETAILED DESCRIPTION OF THE INVENTION

Technical Problem

It is an object of the present disclosure to provide a cylindrical battery which can extend the lifetime of the cylindrical battery by adding an electrolyte, and a method for manufacturing the same.

However, the problem to be solved by the embodiments of the present disclosure is not limited to the above-described problems, and can be variously expanded within the scope of the technical idea included in the present disclosure.

Technical Solution

A cylindrical battery according to an embodiment of the present disclosure includes a metal can, an electrode assembly mounted in the metal can, a cap assembly located at an upper end of the metal can, the cap assembly including a top cap, a safety vent, and a current cut-off member. A hole mark may be formed on the safety vent.

The top cap may include an exhaust hole.

An opening may be formed in the current cut-off member.

The exhaust hole, the hole mark, and the opening may be located along an imaginary straight that is perpendicular to a bottom of the metal can.

The top cap may make contact with the safety vent along a periphery of the safety vent.

The hole mark may be formed on the periphery of the safety vent.

The hole mark may be applied with a dye that is visible by naked eyes through the exhaust hole.

The dye may be a fluorescent dye.

The top cap may include two or more exhaust holes.

The hole mark may be provided as two or more hole marks corresponding to the exhaust holes.

A notch may be formed at the hole mark.

The dye may be applied to the notch.

A method for manufacturing a cylindrical battery by adding an electrolyte to the cylindrical battery may include the steps of forming a through-hole in the hole mark, inserting an electrolyte injection tube into the through-hole, injecting an electrolyte through the electrolyte injection tube, removing the electrolyte injection tube, and sealing the through-hole.

The electrolyte injection pipe may pass through the hole mark while being inclined at a predetermined angle toward the outside of the cylindrical battery with respect to an imaginary straight line that is perpendicular to a bottom of the metal can.

The predetermined angle may be fifty degrees or less.

The step of sealing the through-hole may include a step of sealing the through-hole through laser welding.

The step of sealing the through-hole may include a step of sealing the through-hole with silicone.

Advantageous Effects

As described above, the cylindrical battery and the method for manufacturing the same according to the embodiments of the present disclosure can additionally inject the electrolyte, thereby prolonging the lifetime of the cylindrical battery.

BRIEF DESCRIPTION OF THE DRAWINGS

FIG. 1 is a cross-sectional schematic diagram illustrating a cylindrical battery according to the related art;

FIG. 2 is a cross-sectional schematic diagram illustrating a cylindrical battery according to an embodiment of the present disclosure;

FIG. 3 is a schematic diagram illustrating a safety vent of FIG. 2;

FIGS. 4 and 5 are schematic diagrams illustrating a state in which an electrolyte injection tube of FIG. 2 passes through a cap assembly;

FIG. 6 is a cross-sectional schematic diagram illustrating a cylindrical battery according to an embodiment of the present disclosure;

FIG. 7 is a schematic diagram illustrating a cap assembly of FIG. 6;

FIG. 8 is a cross-sectional schematic diagram illustrating a cylindrical battery according to another embodiment of the present disclosure;

FIG. 9 is a cross-sectional schematic diagram illustrating a cylindrical battery according to another embodiment of the present disclosure; and FIG. 10 is a flow diagram of a method for manufacturing a cylindrical battery.

DETAILED DESCRIPTION OF THE EMBODIMENTS

Hereinafter, various embodiments of the present disclosure will be described in detail with reference to the accompanying drawings so that those skilled in the art can easily implement them. The present disclosure may be modified in various different ways, and is not limited to the embodiments set forth herein.

Further, throughout the specification, when a part is referred to as "including" a certain component, it means that it can further include other components, without excluding the other components, unless otherwise stated.

FIG. 2 is a cross-sectional schematic diagram illustrating a cylindrical battery according to an embodiment of the present disclosure.

Referring to FIG. 2, the cylindrical battery 200 can be configured so that a jelly-roll type electrode assembly 240 inserts into the interior of a metal can 230, and a cap assembly 210 mounts on an opened upper end of the metal can 230. The cap assembly 210 may include a top cap 211, a safety vent 212, a current shut-off member 213, and a gasket 215.

The top cap 211 may have a structure in which a positive electrode terminal is formed to protrude to the outside of the cylindrical battery 200 and an exhaust hole 214 is punched. The top cap 211 may be electrically connected to the safety vent 212 along a periphery of the safety vent 212.

The safety vent 212 may have a predetermined notch 222 formed therein so as to be burst by a high-pressure gas of the cylindrical battery 200. The safety vent 212 maintains a downward protruding structure when the cylindrical battery 200 is normally operated. However, when gas is generated in the interior of the cylindrical battery 200 and the internal pressure of the gas increases, the safety vent 212 may protrude upwards to be burst and thus the internal gas may be discharged.

The current shut-off member 213 may interrupt current to relieve internal pressure when the cylindrical battery 200 abnormally operates. The current shut-off member 213 may be mounted on a space between the electrode assembly 240 and the safety vent 212. An opening 217, through which an electrolyte injection tube 50 passes, may be formed in the current shut-off member 213.

The gasket 215 may be mounted on an outer peripheral surface of the top cap 211 to electrically insulate the top cap 211 acting as the positive electrode terminal and the metal can 230 acting as a negative electrode terminal.

FIG. 3 is a schematic diagram illustrating a safety vent of FIG. 2.

Referring to FIGS. 2 and 3, a hole mark 216, through which the electrolyte injection tube 50 may pass, may be marked on the safety vent 212. The location of the hole mark 216 is not particularly limited, but may be formed at a periphery of the safety vent 212, which makes contact with the top cap 211. In order to form a through-hole, through which the electrolyte injection tube 50 passes in the hole mark 216, a predetermined pressure may be applied to the electrolyte injection tube 50 to form the through-hole. Here, it is not preferable that a structure of the safety vent 212 is deformed by the pressure. Accordingly, it is preferable that the hole mark 216 is formed at the peripheral portion of the safety vent 212, which makes contact with the top cap 211, such that the safety vent 212 is not deformed by the pressure.

FIGS. 4 and 5 are schematic diagrams illustrating a state in which an electrolyte injection tube of FIG. 2 passes through a cap assembly.

Referring to FIG. 4, the electrolyte injection tube 50 shaped like an injection needle may pass through the exhaust hole 214 and then pass through the hole mark 216 and the opening 217. The exhaust hole 214, the hole mark 216, and the opening 217 may be located in a row on an imaginary straight line (a dotted line arrow of FIG. 4) that is perpendicular to a ground surface and faces an opposite direction to the gravity. Through the structure, the electrolyte injection tube 50 may pass through the cap assembly 210 in a direction that is perpendicular to the ground surface and is opposite to the gravity.

Referring to FIG. 5, the electrolyte injection tube 50 may be inserted while being inclined by a predetermined angle (θ) toward the outside of the cylindrical battery 200 with respect to the imaginary straight line (the dotted line arrow of FIG. 4) that is perpendicular to the ground surface and faces an opposite direction to the gravity. If the electrolyte injection tube 50 has a structure that passes through the exhaust hole 214, the hole mark 216, and the opening 217, the present disclosure is not particularly limited, but the angle (θ) may be fifty degrees or less. When the angle (θ) exceeds fifty degrees, it is not preferable because the electrolyte injection tube 50 may deform the structure of the safety vent 212. However, the angle (θ) may exceed fifty degrees depending on the structure of the safety vent 212.

When the through-hole, through which the electrolyte injection tube 50 passes, is formed in the hole mark 216, the through-hole may be formed by pressing the electrolyte injection tube 50, and the through-hole may be also formed by using a separate device.

The gasket 215 may be mounted so as to surround the periphery of the top cap 211 to electrically insulate the top cap 211 acting as the positive electrode terminal and the metal can 230 acting as the negative electrode terminal.

FIG. 6 is a cross-sectional schematic diagram illustrating a cylindrical battery according to another embodiment of the present disclosure. FIG. 7 is a schematic diagram illustrating a cap assembly 310 of FIG. 6.

Referring to FIGS. 6 and 7, the cylindrical battery 300 may include a cap assembly 310 including a safety vent 312, in which a hole mark 316 is formed. The hole mark 316 may be applied with a dye that is visible by naked eyes. For example, the hole mark 316 may be applied with a fluorescent dye.

Further, the dye applied to the hole mark 316 may have a water resistance, by which the dye is prevented from being removed due to moisture generated in the interior of the cylindrical battery 300. Further, the dye applied to the hole mark 316 may have a heat resistance, by which the dye is prevented from being influenced due to heat generated in the interior of the cylindrical battery 300.

Due to the structure, an operator may recognize the location of the hole mark 316 by naked eyes through an exhaust hole 314.

The cylindrical battery 300 is the same structure as the cylindrical battery 200 illustrated in FIG. 2 except for the above-described structure, and thus a detailed description thereof will be omitted.

FIG. 8 is a cross-sectional schematic diagram illustrating a cylindrical battery according to another embodiment of the present disclosure.

Referring to FIG. 8, the cylindrical battery 400 may have a structure including two or more electrolyte injecting paths. The cylindrical battery 400 may include a safety vent 412, in which two or more hole marks 416 are formed. In correspondence to the locations of two or more hole marks 416, a top cap 411 may include two or more exhaust holes 414. Further, in correspondence to the locations of two or more hole marks 416, a current shut-off member 413 may include two or more openings 417.

Through the structure, the cylindrical battery 400 may include two or more paths, through which the electrolyte injection tube 50 may pass, and an operator may uniformly disperse an electrolyte to an electrode assembly 440.

The cylindrical battery 400 is the same structure as the cylindrical battery 200 illustrated in FIG. 2 except the above-described structure, and thus a detailed description thereof will be omitted.

FIG. 9 is a cross-sectional schematic diagram illustrating a cylindrical battery according to another embodiment of the present disclosure. A illustrates an enlarged notch formed in a hole mark.

Referring to FIG. 9, the cylindrical battery 500 may include a safety vent 512, in which a hole mark 516 is formed. The hole mark 516 may include a notch 526. The shape of the notch 526 is not particularly limited, but may be a structure having a rectangular cross-section as an example. A portion of the hole mark 516, at which the notch 526 is formed, may have a thin thickness as compared with the other portions of the safety vent 512.

A dye that is visible by naked eyes may be applied to the portion of the safety vent 512, at which the notch 526 is formed.

Due to the structure, an electrolyte injection tube 50 may pass through the hole mark 516 even with a relatively small pressure.

In the cylindrical batteries 200, 300, 400, and 500 according to the present disclosure, an electrolyte corresponding to 10% to 20% of the injected electrolyte may be added through the hole marks 216, 316, 416, and 516 when the cylindrical batteries are manufactured.

If the electrolyte is completely added, the through-holes formed in the hole marks 216, 316, 416, and 516 can be sealed through laser welding or with silicone. Through the addition of electrolytes, it can be identified that lifetimes of the cylindrical batteries 200, 300, 400, and 500 are prolonged by 30% to 35%. The added electrolytes can be manufactured while a specific component is added and/or removed according to the deterioration of the batteries.

FIG. 10 is a flow diagram of a method for manufacturing a cylindrical battery.

The method for manufacturing one of the cylindrical battery by adding an electrolyte to the cylindrical battery generally includes forming a through-hole in the hole mark (S1), inserting an electrolyte injection tube into the through-hole (S2), injecting an electrolyte through the electrolyte injection tube (S3), removing the electrolyte injection tube (S4), and sealing the through-hole (S5).

Based on the above disclosure, this is to be understood by those of ordinary skill in the art that various applications and modifications can be made within the scope of the present disclosure.

The invention claimed is:

1. A cylindrical battery, comprising:
   a metal can;
   an electrode assembly mounted in the metal can; and
   a cap assembly located at an upper end of the metal can, the cap assembly including:
   a top cap;
   a safety vent; and
   a current shut-off member,
   wherein a hole mark is formed on the safety vent,
   wherein a notch is formed at the hole mark, and
   wherein the hole mark is a dye that is applied to the notch.

2. The cylindrical battery of claim 1, wherein the top cap comprises an exhaust hole.

3. The cylindrical battery of claim 2, wherein an opening is formed in the current shut-off member.

4. The cylindrical battery of claim 3, wherein the exhaust hole, the hole mark, and the opening are located along an imaginary straight line that is perpendicular to a bottom of the metal can.

5. The cylindrical battery of claim 1, wherein the top cap makes contact with the safety vent along a periphery of the safety vent.

6. The cylindrical battery of claim 5, wherein the hole mark is formed on the periphery of the safety vent.

7. A cylindrical battery, comprising:
a metal can;
an electrode assembly mounted in the metal can; and
a cap assembly located at an upper end of the metal can, the cap assembly including:
a top cap;
a safety vent; and
a current shut-off member,
wherein a hole mark is formed on the safety vent,
wherein the top cap comprises an exhaust hole, and
wherein the hole mark is applied with a dye that is visible by naked eyes through the exhaust hole.

8. The cylindrical battery of claim 7, wherein the dye is a fluorescent dye.

9. The cylindrical battery of claim 1, wherein the top cap comprises two or more exhaust holes.

10. A cylindrical battery, comprising:
a metal can;
an electrode assembly mounted in the metal can; and
a cap assembly located at an upper end of the metal can, the cap assembly including:
a top cap having two or more exhaust holes;
a safety vent; and
a current shut-off member,
wherein a hole mark is formed on the safety vent,
wherein a notch is formed at the hole mark,
wherein the top cap comprises two or more exhaust holes, and
wherein the hole mark is provided as two or more hole marks corresponding to the exhaust holes.

11. A method for manufacturing a cylindrical battery of claim 1 by adding an electrolyte to the cylindrical battery, the method comprising the steps of:
forming a through-hole at the hole mark;
inserting an electrolyte injection tube into the through-hole;
injecting an electrolyte through the electrolyte injection tube;
removing the electrolyte injection tube; and
sealing the through-hole.

12. The method of claim 11, wherein the electrolyte injection tube passes through the hole mark while being inclined at a predetermined angle toward the outside of the cylindrical battery with respect to an imaginary straight line that is perpendicular to a bottom of the metal can.

13. The method of claim 12, wherein the predetermined angle is fifty degrees or less.

14. The method of claim 11, wherein the step of sealing the through-hole comprises a step of sealing the through-hole through laser welding.

15. The method of claim 11, wherein the step of sealing the through-hole comprises a step of sealing the through-hole with silicone.

16. The cylindrical battery of claim 7, wherein an opening is formed in the current shut-off member.

17. The cylindrical battery of claim 16, wherein the exhaust hole, the hole mark, and the opening are located along an imaginary straight line that is perpendicular to a bottom of the metal can.

18. The cylindrical battery of claim 7, wherein the top cap makes contact with the safety vent along a periphery of the safety vent, and
wherein the hole mark is formed on the periphery of the safety vent.

* * * * *